(12) United States Patent
Jones et al.

(10) Patent No.: US 10,558,829 B2
(45) Date of Patent: **\*Feb. 11, 2020**

(54) RADIO FREQUENCY MONITORING OF A SHOPPING FACILITY

(71) Applicant: Walmart Apollo, LLC, Bentonville, AR (US)

(72) Inventors: Nicholaus A. Jones, Fayetteville, AR (US); Jeremy R. Tingler, Bentonville, AR (US); Alvin S. Taulbee, Springdale, AR (US); Todd D. Mattingly, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/436,376

(22) Filed: Jun. 10, 2019

(65) Prior Publication Data

US 2019/0294835 A1 Sep. 26, 2019

Related U.S. Application Data

(63) Continuation of application No. 16/041,425, filed on Jul. 20, 2018, now Pat. No. 10,366,261.

(Continued)

(51) Int. Cl.
*G06K 7/10* (2006.01)
*B62B 5/00* (2006.01)
*G06Q 10/08* (2012.01)

(52) U.S. Cl.
CPC ........ *G06K 7/10376* (2013.01); *B62B 5/0096* (2013.01); *G06K 7/10475* (2013.01); *G06Q 10/087* (2013.01)

(58) Field of Classification Search
CPC ............ C12Q 1/6827; C12Q 2565/125; C12Q 2565/501; B62B 5/0096; G06K 7/10376; G06K 7/10475; G06Q 10/087

(Continued)

(56) References Cited

U.S. PATENT DOCUMENTS 6,584,375 B2 6/2003 Bancroft
8,022,812 B2 9/2011 Beniyama (Continued)

OTHER PUBLICATIONS

PCT; App. No. PCT/US2018/042801; International Search Report and Written Opinion dated Sep. 19, 2018.

(Continued)

*Primary Examiner* — Yong Hang Jiang
(74) *Attorney, Agent, or Firm* — Fitch, Even, Tabin & Flannery LLP (57) ABSTRACT

In some embodiments, systems, apparatuses, and methods are provided herein useful to monitor a shopping facility. The shopping facility can include an array of radio frequency identification (RFID) readers distributed throughout the facility to thereby receive and read signals generated from RFID tags within the facility. RFID tags can advantageously be coupled to and associated with products within the facility so that readings of the tags can be used to monitor the status of the products. A control circuit can be coupled to the RFID readers to thereby analyze the readings and compile readings over time. With this, the control circuit can monitor the shopping facility to identify scenarios requiring follow up. Upon identification of one of the scenarios, the control circuit can instruct an automated ground vehicle (AGV) to inspect an identified product at a location within the facility. The AGV can operate a sensor thereof to determine a status of the identified product.

20 Claims, 10 Drawing Sheets

Related U.S. Application Data

(60) Provisional application No. 62/535,397, filed on Jul. 21, 2017.

(58) Field of Classification Search
 USPC .................................................. 340/10.1, 3.1
 See application file for complete search history.

(56) References Cited

U.S. PATENT DOCUMENTS

| | | |
|---|---|---|
| 9,323,250 B2 | 4/2016 | Wang |
| 9,457,463 B2 | 10/2016 | Tadayon |
| 9,722,715 B2 * | 8/2017 | Nair ........................ H04B 17/27 |
| 2002/0165790 A1 | 11/2002 | Bancroft |
| 2005/0149414 A1 | 7/2005 | Schrodt |
| 2007/0061041 A1 | 3/2007 | Zweig |
| 2008/0077511 A1 | 3/2008 | Zimmerman |
| 2011/0068922 A1 | 3/2011 | Ross |
| 2011/0320322 A1 | 12/2011 | Roslak |
| 2012/0161967 A1 | 6/2012 | Stern |
| 2012/0319819 A1 | 12/2012 | Tkachenko |
| 2014/0152507 A1 | 6/2014 | McAllister |
| 2014/0320265 A1 * | 10/2014 | Jones ................. G06Q 10/0833 340/10.1 |
| 2014/0361078 A1 * | 12/2014 | Davidson ........... G06K 7/10356 235/385 |
| 2015/0194030 A1 | 7/2015 | Davidson |
| 2016/0114488 A1 | 4/2016 | Mascorro Medina |
| 2016/0304280 A1 | 10/2016 | Elazary |
| 2017/0116446 A1 | 4/2017 | Sample |

OTHER PUBLICATIONS

USPTO; U.S. Appl. No. 16/041,425; Notice of Allowance dated Mar. 11, 2019; (pp. 1-14).

* cited by examiner

RADIO FREQUENCY MONITORING OF A SHOPPING FACILITY

CROSS-REFERENCE TO RELATED APPLICATION

This application is a continuation of U.S. application Ser. No. 16/041,425, filed Jul. 20, 2018, which claims the benefit of U.S. Provisional Application No. 62/535,397, filed Jul. 21, 2017, which are incorporated by reference in their entirety herein.

TECHNICAL FIELD

This invention relates generally to monitoring a shopping facility and, more particularly, to monitoring radio frequency readings within a shopping facility.

BACKGROUND

The distribution and location of items within a retail location can be important to a retailer to maximize sales. Retail locations have to decide where to place certain items based in part on popularity, type, and power supply needs, to name a few. Additionally, maintaining sufficient stock levels for products within the retail location can be important to prevent lost sales. Accordingly, any information on customer location and movement within the retail location, as well as product movement, can be very helpful.

BRIEF DESCRIPTION OF THE DRAWINGS

Disclosed herein are embodiments of systems, apparatuses and methods pertaining generally to radio frequency identification (RFID) and the use of RFID tag information. This description includes drawings, wherein.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to monitor a shopping facility. The shopping facility can include an array of radio frequency identification (RFID) readers distributed throughout the facility to thereby receive and read signals generated from RFID tags within the facility. RFID tags can advantageously be coupled to and associated with products within the facility so that readings of the tags can be used to monitor the status of the products. A control circuit can be coupled to the RFID readers to thereby analyze the readings and compile readings over time. With this, the control circuit can monitor the shopping facility to identify scenarios requiring follow up. Upon identification of one of the scenarios, the control circuit can instruct an automated ground vehicle (AGV) to inspect an identified product at a location within the facility. The AGV can operate a sensor thereof to determine a status of the identified product. The control circuit then analyzes the sensor reading to determine whether to involve an associate. As such, the control circuit in combination with the RFID readers and AGV can automatically monitor the shopping facility to determine whether a situation requires an associate thereby saving time and resources on situations that do not require additional action.

Before setting forth additional details regarding the various embodiments described herein, first background information will be provided on utilizing transmitters and receivers to locate a particular product. By way of example, the description container herein will refer to the transmitters as RFID tags and the receivers as RFID readers. It is understood that any type of currently existing transmitter and receivers can be used. For example, a control circuit can have access to coverage information that maps the coverage area for each of a plurality of RFID-tag readers to physical locations within a given monitored facility. The control circuit then uses those readers to read, over time, a population of RFID tags and store historical-read information comprising corresponding RFID-system metrics along with tag-specific information and corresponding timestamps regarding when the reads occurred. The control circuit uses that historical-read information as corresponds to a given period of time and the aforementioned coverage information to determine sub-groups of the population of RFID tags and then uses the historical-read information to calculate at least one aggregated RFID-system metric on a sub-group level basis for at least some of the sub-groups. That aggregated RFID-system metric can be leveraged in a variety of ways. For example, the control circuit can use the aggregated RFID-system metric to determine the location of a particular RFID tag by comparing the aggregated RFID-system metric to read-based information regarding the particular RFID tag.

These teachings are highly flexible in practice and will accommodate a variety of approaches as regard the foregoing actions. For example, the aforementioned RFID system metric can include, in a given application setting, any one or more of a particular RFID-tag reader, a particular RFID-tag reader antenna (or logical antenna), a received signal strength indicator value, a received signal phase angle, a total number of reads, and so forth. As another example, the aforementioned sub-groups can be defined, at least in part, by product-based categories (such as, but not limited to, Universal Product Code product-based categories).

These teachings can be particularly helpful in application settings that involve tens of thousands (or even hundreds of thousands) of RFID tags within a given monitored facility. In particular, these teachings can be readily leveraged in a variety of ways to compensate for an inability to read all RFID tags all the time and also to help leverage as well as disambiguate location information that can arise from application settings that employ a plurality of RFID-tag readers having at least partially overlapping coverage areas. Those skilled in the art will further appreciate that the statistics-based data provided per these teachings can offer a considerable increase as regards the reliability of physical location conclusions that are based upon RFID-tag reads.

Figure 1:
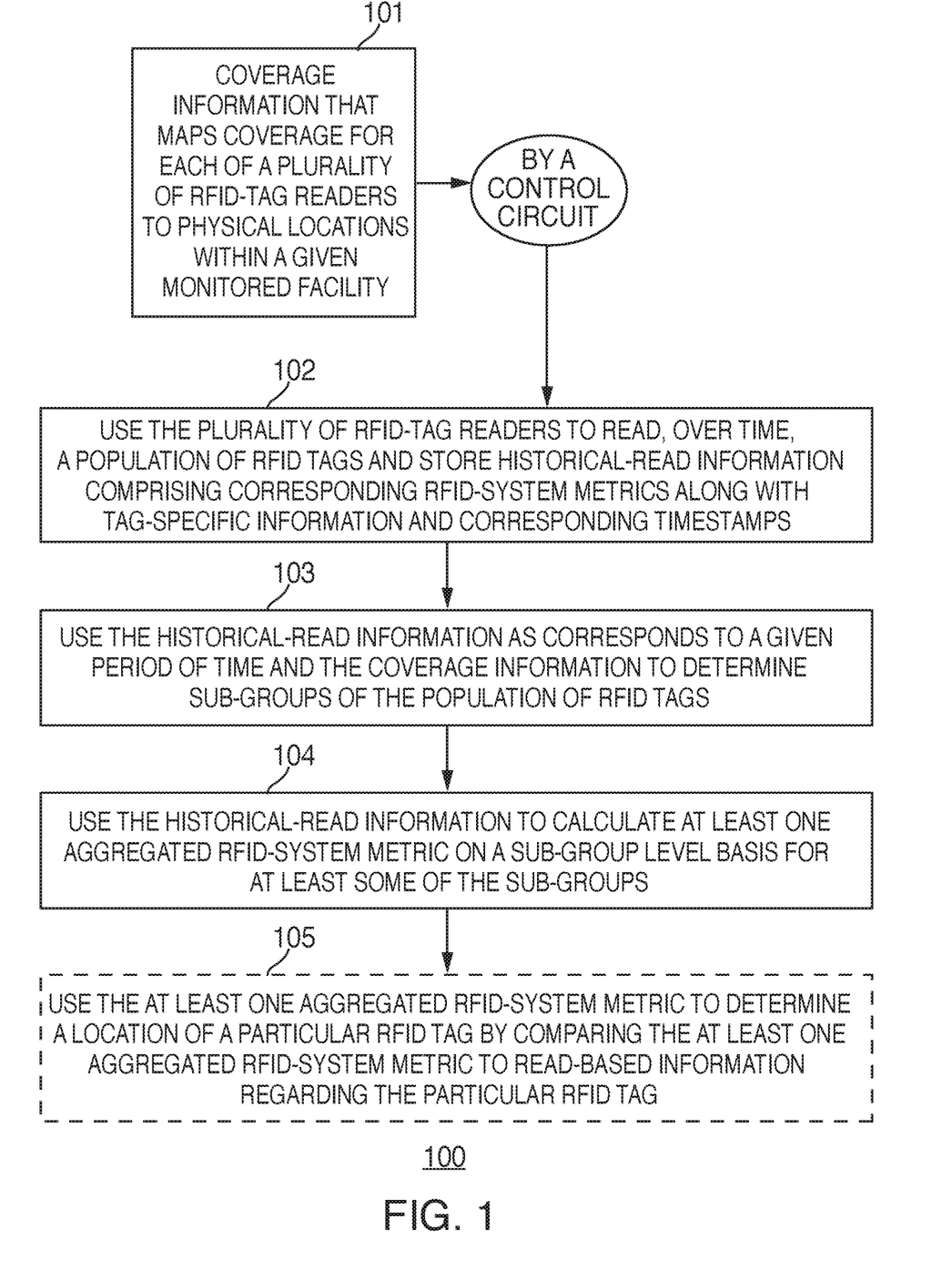
FIG. 1 is a flow diagram as configured in accordance with some embodiments.

These and other benefits may become clearer upon making a thorough review and study of the following detailed description. Referring now to the drawings, and in particular to FIG. 1, an illustrative process 100 that is compatible with many of these teachings will now be presented. For the sake of an illustrative example this description will presume that a control circuit carries out the described activities and that this control circuit has access to coverage information 101 that maps coverage for each of a plurality of RFID tag readers to physical locations within a given monitored facility.

Figure 2:
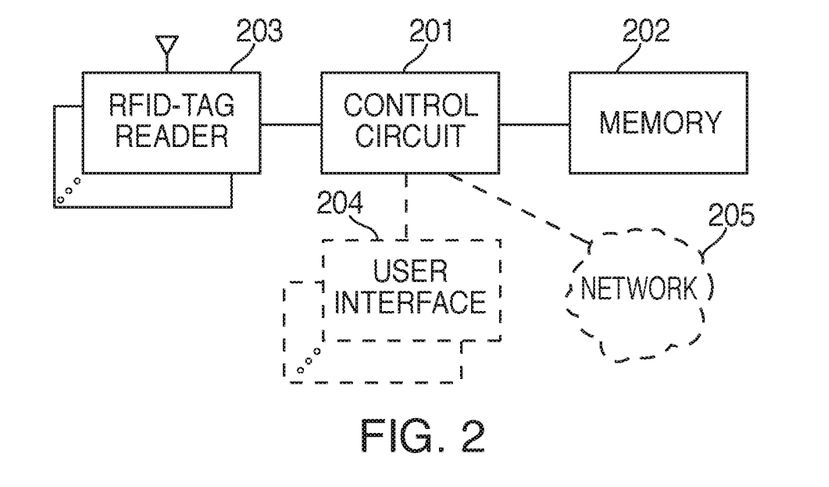
FIG. 2 is a block diagram as configured in accordance with several embodiments.

Referring to FIG. 2, such a control circuit 201 can comprise a fixed-purpose hard-wired platform or can comprise a partially or wholly programmable platform. These architectural options are well known and understood in the art and require no further description here. This control circuit 201 is configured (for example, by using corresponding programming as will be well understood by those skilled in the art) to carry out one or more of the steps, actions, and/or functions described herein.

The control circuit 201 in this example operably couples to a memory 202. The memory 202 may be integral to the control circuit 201 or can be physically discrete (in whole or in part) from the control circuit 201 as desired. This memory 202 can also be local with respect to the control circuit 201 (where, for example, both share a common circuit board, chassis, power supply, and/or housing) or can be partially or wholly remote with respect to the control circuit 201 (where, for example, the memory 202 is physically located in another facility, metropolitan area, or even country as compared to the control circuit 201).

This memory 202 can serve, for example, to store the aforementioned coverage information 101. This memory 202 can also serve to non-transitorily store the computer instructions that, when executed by the control circuit 201, cause the control circuit 201 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

In this example, the control circuit 201 also operably couples to a plurality of RFID-tag readers 203 that are dispersed about the corresponding monitored facility. A variety of approaches are known in the art in these regards. It will be presumed here that at least some of the RFID-tag readers 203 are mounted to or are otherwise suspended from the ceiling of the facility and that at least some of the RFID-tag readers each have a plurality of reader antennas and/or include a steerable phased antenna array.

Figure 3:
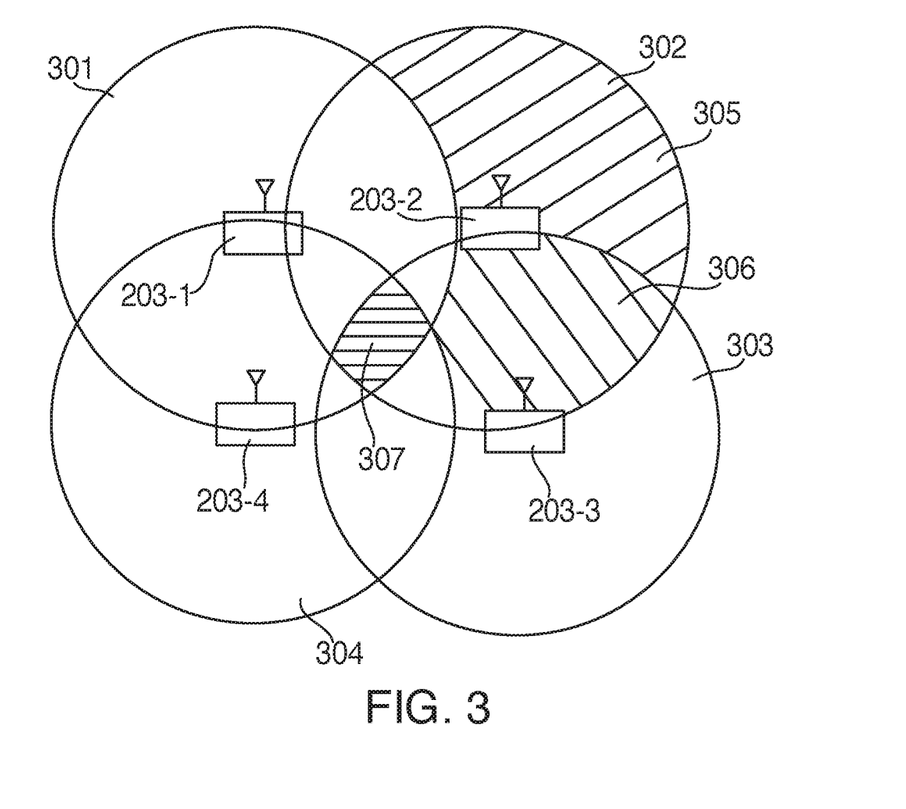
FIG. 3 is a top plan schematic view as configured in accordance with some embodiments.

In a typical application setting the coverage area for each such RFID-tag reader 203 is likely to at least partially overlap with the coverage area of at least one other RFID-tag reader 203. FIG. 3 presents a simplified illustrative example in these regards. In this example, there are four RFID-tag readers (denoted by reference numerals 203-1 through 203-4) that are spaced apart from one another and that each have a corresponding coverage area (denoted by reference numerals 301 through 304).

This reference to "coverage area" will be understood to refer to the effective reading coverage area engendered by a particular antenna; i.e., the three-dimensional volume within which the radiated radio-frequency energy is, at least for the most part, of sufficient magnitude to power up an ordinary RFID tag that is used at the facility. It will be understood that this power level will not be consistent throughout a given coverage area (for example, the power level at one area within the coverage area may be less than other areas but still sufficient in and of itself to power up an RFID tag). For many application settings, a suitable power level will be −15 dbm and above.

It will also be understood that the effective coverage area can itself include not only hot spots of higher energy but also nulls where the local energy level is too low to power an RFID tag as described. Nulls and hot spots are the result of the radio-frequency energy reflecting off various surfaces and constructively interfering (hence producing hot spots) or destructively interfering (hence producing nulls). A further nuance is that such nulls and hot spots can alternate from one wave length to another. The presence of such nulls within such a volume shall be understood to not alter a fair characterization of such a volume as comprising an effective "coverage area" for a given RFID-tag reader 203.

As illustrated in FIG. 3, coverage areas for different RFID-tag readers 203 can occur and vary in any of a variety of ways. The area denoted by reference numeral 305 as comprises a part of the coverage area 302 for the RFID-tag reader denoted by reference numeral 203-2 only receives energy from that one RFID-tag reader 203-2. The area denoted by reference numeral 306, however, represents overlap between two different coverage areas 302 and 303 as correspond to two different RFID-tag readers 203-2 and 203-3. And the area denoted by reference numeral 307 represents overlap between all four coverage areas 301 through 304.

The present teachings presume an a priori understanding, at least to some useful degree, of the coverage areas as apply with respect to a given monitored facility. This understanding includes an understanding of the location of the RFID-tag readers 203 within the facility and the general metes and bounds of the three-dimensional coverage areas as correspond to each such RFID-tag reader 203. If desired, such information can be developed using an empirical approach that provides for taking readings at various locations within the facility to thereby determine these boundaries and volumes. By another approach, in lieu of the foregoing or in combination therewith, such information may be developed or refined over time and during ordinary use of the RFID system when and as appropriate.

Figure 4:
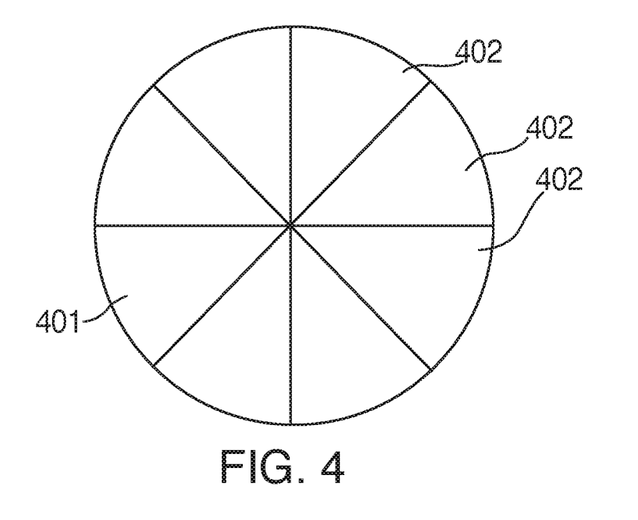
FIG. 4 is a top plan schematic view as configured in accordance with several embodiments.

As noted earlier, a given RFID-tag reader 203 can have a plurality of antennas and/or can include a steerable phased antenna array. In either case the coverage area for a given RFID-tag reader 203 can be further subdivided as function of those various antennas (or sectors). FIG. 4 presents, for example, a coverage area 401 for an RFID-tag reader 203 having eight antennas equally distributed about its periphery to thereby define eight sectors 402 that together comprise the complete coverage area 401 for this RFID-tag reader 203. (In fact, in many such application settings, there can be coverage overlap between, for example, adjacent antennas. Accordingly, if desired, the coverage information for such an RFID-tag reader 203 can also account for adjacent-antenna overlapping coverage areas if desired.)

Figure 5:
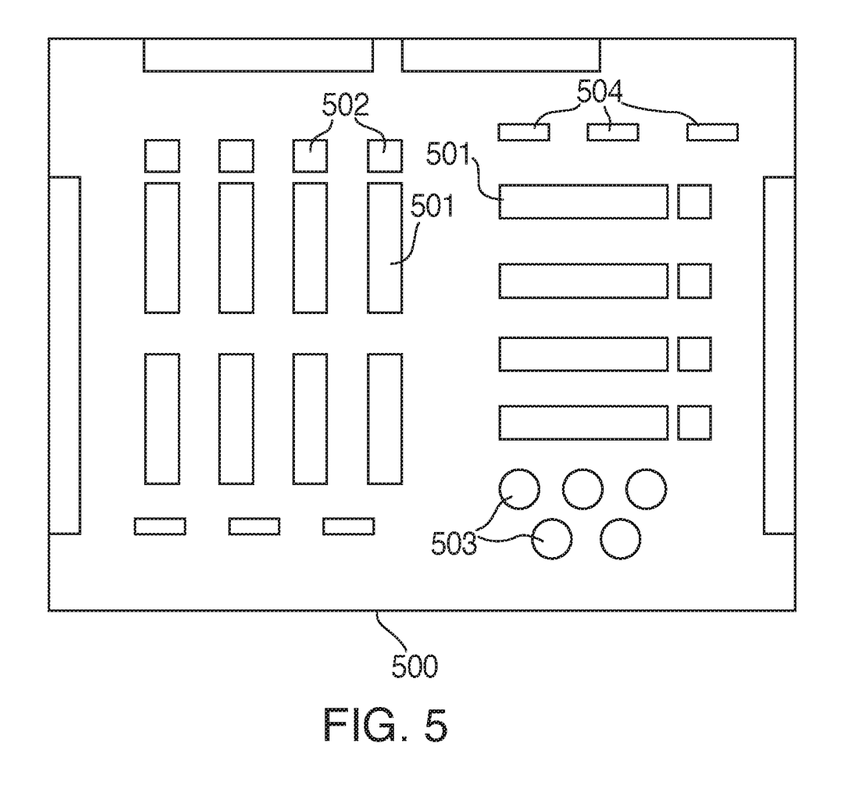
FIG. 5 is a top plan schematic view as configured in accordance with some embodiments.

The foregoing information regarding the metes and bounds of the coverage areas for each of the aforementioned RFID-tag readers 203 are then mapped to the actual physical locations of the monitored facility. For the sake of an illustrative example FIG. 5 presents a simple map for a facility 500 that comprises a retail sales establishment. This facility 500 includes a variety of different product displays 55 including a plurality of shelves 501, so-called end-cap displays 502, racks 503, and free-standing presentations 504. The aforementioned coverage information 101 comprises a to-scale merger and registration of the physical location information of such a facility 500 with the coverage area information as corresponds to the various RFID-tag readers 203 at this facility 500.

Referring again to FIG. 2, if desired, the control circuit 201 can also operably couple to one or more user interfaces 204 and one or more communication networks 205. This user interface 204 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user. The network 205, in turn, can comprise any of a variety of internal and/or external networks including intranets and extranets (such as but not limited to the Internet).

Referring again to FIG. 1, at 102 such a control circuit 201 uses the plurality of RFID-tag readers 203 to read, over time and often many times, a population of RFID tags. The control circuit 201 then stores historical-read information as pertains to these reads.

By one approach this historical-read information includes corresponding RFID-system metrics. Examples of such metrics include but are certainly not limited to a particular RFID-tag reader (that is, an identifier for the particular RFID-tag reader that read the RFID tag), a particular RFID-tag reader antenna (for example, when the RFID-tag reader antenna for a given RFID-tag reader comprises a plurality of sectored antennas), a particular RFID-tag reader logical antenna (for example, when the RFID-tag reader makes use of a steerable phased antenna array), a received signal strength indicator (RSSI) value as corresponds to the read response provided by the RFID tag when read, a received signal phase angle as corresponds to the read event, and/or a total number of reads to note but a few examples in these regards.

This historical-read information can also include tag-specific information regarding each read RFID tag. This tag-specific information can include, for example, a unique electronic product code as specified by the aforementioned standard denoted as EPC Radio-Frequency Identity Protocols Class-1 Generation-2 UHF RFID Protocol for Communications at 860 MHz-960 MHz Version 1.0.9. Such an EPC code, of course, will serve to uniquely identify each RFID tag and thereby serve to distinguish read RFID tags from one another.

And, if desired, the historical-read information can also include a corresponding timestamp to denote the time at which each read occurred. The granularity of this timestamp can be as course or as fine as may be desired. Generally speaking, for many application settings it may suffice if the timestamp is accurate to within plus or minus 0.01 seconds. In other cases, it may be sufficient to simply know, for example, the hour of the day when the read occurred.

Over time, this historical-read information will contain multiple reads for some (but perhaps not all) of the same RFID tags. This historical-read information will therefore illustrate what RFID-system metrics remain generally the same for a given RFID tag and which have varied over time. As a very simple example in these regards, TABLE 1 presents historical-read information as regards which of two RFID-tag readers 203 read either of two RFID tags (i.e., RFID-tag 001 and RFID-tag 002).

TABLE 1

| TAG ID | READER A | READER B |
|--------|----------|----------|
| 001    | X        |          |
| 001    | X        |          |
| 002    | X        |          |
| 001    | X        |          |
| 002    |          | X        |
| 001    | X        |          |
| 002    |          | X        |
| 002    |          | X        |

This historical-read information reveals that, over the time period in question, RFID-tag 001 was read four times, each time by RFID-tag reader A, while RFID-tag 002 was also read four times, once by RFID-tag reader A and three times by RFID-tag reader B. This historical-read information also reveals that all three of the most recent reads for RFID tag 002 were by RFID-tag reader B. (It will be understood that this example is highly simplified; as noted above the data items that comprise the historical-read information can be considerably more complete, varied, nuanced, and rich.)

At 103, the control circuit 201 uses the historical-read information as corresponds to a given period of time of interest (such as a specified hour, day, week, or such other period of contiguous time as might be of interest in a given application setting) and the aforementioned coverage information 101 to determine sub-groups of the population of RFID tags. The specific nature of the sub-groups can vary as desired. For the sake of an illustrative example it will be presumed here that the sub-groups are defined, at least in part, by product-based categories. For example, these product-based categories can comprise Universal Product Code categories as are known in the art (such as, but not limited to, the UPC-A which consists of 12 numerical digits that identify both the manufacturer and the generic (rather than individual) trade item).

In some cases, this product categorization information may be provided by the RFID tag itself as part of its tag-specific information. In other cases, the unique identifier provided by the RFID tag as part of its tag-specific information can be used to look-up the product categorization as corresponds to this particular RFID tag.

More specifically, this activity at 103 serves to identify groupings of RFID tags as correspond to given product types and the corresponding physical locations of those product-based groupings within the facility 500. By way of some very simple examples, at 103 the control circuit 201 can determine that Brand ABC jeans are kept at a first physical location in the facility 500, Brand DEF shaving cream is kept at a second, different physical location in the facility 500, and Brand GHI toasters are kept at a third, different-again physical location in the facility 500.

These determinations can, of course, be more subtle in some cases. The control circuit 201 can determine, for example, that the sub-groups include two different groupings of the same item, albeit at two different locations. For example, one sub-group of Brand ABC jeans might be located on a shelf at a first physical location and a second sub-group of Brand ABC jeans might be located in an end-cap display at a second, different physical location. Consider, for example, the historical-read information presented in TABLE 2.

TABLE 2

| TAG ID | READER A | READER B |
|---|---|---|
| 001 | 95% | 5% |
| 002 | 93% | 7% |
| 003 | 25% | 75% |
| 004 | 92% | 8% |
| 005 | 20% | 80% |
| 006 | 96% | 4% |
| 007 | 18% | 82% |
| 008 | 5% | 95% |
| 009 | 95% | 5% |

In TABLE 2, the number of reads have been aggregated for each RFID tag for each product category (in this case, say, Brand ABC jeans) and that information used to determine the percentage of reads for each RFID tag in this sub-group that were by RFID-tag reader A and that were by RFID-tag reader B. For RFID-tag 001, for example, 95% of the reads were by RFID-tag reader A and 5% of the reads were by RFID-tag reader B. A review of the data indicates that the RFID tags of this sub-group are likely located at one of two physical locations, with a first physical location having RFID tags 001, 002, 004, 006, and 009 and with a second physical location having RFID tags 003, 005, 007, and 008.

In any event, to this point in the process, the control circuit has formed subgroupings (such as product-based sub-groupings) of the RFID tags in the facility 500 based on, at the least, the aforementioned historical-read information and the coverage information 101 and those sub-groups have been associated with specific physical locations in the facility 500.

At 104, the control circuit 201 then uses the historical-read information 101 to calculate at least one aggregated RFID-system metric on a sub-group level basis for at least some of the determined sub-groups. An example in these regards is to calculate an average value for a given one of the RFID-system metrics for members of the sub-group. As a very simple but illustrative example in these regards, the average values for the RFID tags for the two sub-groups of Brand ABC jeans detailed in TABLE 2 could be averaged to yield the result shown in TABLE 3.

TABLE 3

| SUB-GROUP | READER A | READER B |
|---|---|---|
| ABC jeans sub-group 1 | 94.2% | 5.8% |
| ABC jeans sub-group 2 | 17% | 83% |

In effect, the control circuit 201 determines a profile comprising an aggregated view of one or more RIFD-system metrics for RFID tags that comprise a specific sub-group. As noted above, the breadth and depth of these RFID-system metrics can be considerable and as a result the corresponding profiles can be multi-faceted and multi-dimensional. And, since the sub-groups themselves are correlated to physical locations within the facility 500, so too are these RFID-system metrics profiles.

By one approach, the control circuit 201 can conduct and re-conduct the aforementioned actions on as frequent a basis as might be wished. When re-conducting the actions, the control circuit 201 can use a same sampling period as was used in previous process cycles or can use different sampling periods if desired. For example, if it is known that significant changes were recently made to the sales floor (for example, to accommodate some significant quantity of seasonal offerings), it may be useful to restrict the sample period to only relatively recent reads. When significant changes to the presentation of stock have not likely happened, however, it can be useful to utilize relatively long sample periods.

These RFID-system metrics profiles can be utilized and leveraged in a wide variety of ways. As but one simple illustrative example in these regards, at 105 the control circuit 201 can optionally use the at least one aggregated RFID-system metric to determine a location of a particular RFID tag by comparing the at least one aggregated RFID system metric to read-based information regarding this particular RFID tag.

Consider, for example, an RFID tag that is read for only the very first time on the sales floor of the facility 500 by RFID-tag reader A. The tag-specific information provided by the RFID tag, when read, can serve to associate this RFID tag with a particular product offering. When that product offering is a pair of Brand ABC jeans, the control circuit 201 can then reference, for example, the information in TABLE 3. Since this RFID tag was read by RFID-tag reader A, the statistical likelihood is that the RFID tag is associated with a pair of jeans that is part of the ABC jeans sub-group 1 rather than the ABC jeans sub-group 2. The control circuit 201 can then, with a considerable degree of reliability, determine the location of this particular RFID tag to be the same location as the ABC jeans sub-group 1. If and as additional reads for this particular RFID tag become available, those additional reads will provide further data to confirm, or to correct, that conclusion.

As another example, the disclosed historical information provides metrics that can be grouped by utilizing the aforementioned product categorizations. Accordingly, information metrics provided by a particular read RFID tag can be compared to the metrics for all the product-based sub-groups to identify when the item that corresponds to that particular RFID tag is physically out of place as well as where instead that item presently resides to facilitate having an associate find and transfer that item to its appropriate display area.

So configured, an RFID system in a given facility can readily and reliably correlate individual RFID tags with specific physical locations notwithstanding any specific information from the RFID tags regarding such locations and even when potentially lacking much of a read history for any particular RFID tag. The foregoing benefits are attained without using any special RFID-tag markers or beacons and hence there are no incremental infrastructure costs associated with these teachings. Instead, these teachings leverage what has been a key problem in this field (i.e., a high number of RFID tags in a given space) to build RFID-system metrics profiles that can reliably, quickly, and easily help determine the physical location of even a newly-introduced RFID tag to the monitored space.

Using the above described methodologies, the control circuit 201 is able to identify the locations of RFID tags in 3D space. The system described herein advantageously utilizes such RFID locationing configurations and methods to monitor a shopping facility for predetermined events or situations. Upon detection of one of the predetermined events, the system can dispatch an automated ground vehicle (AGV) 60 to inspect a product 62 or location 64 within the shopping facility 50 to determine whether the scenario requires additional follow up by an associate. This saves time and money over having to send an associate to physically inspect each event.

The system compiles RFID readings over time to compile a history for each associated RFID tag 66. The history of each RFID tag 66 shows fluctuations of the read rate and received signal strength of the RFID readings over time and these fluctuations are analyzed by the system to identify predetermined events. The fluctuations can provide an indication of customers or other objects being adjacent to the RFID tag 66, the RFID tag 66 being moved, and so forth. Consequently, the fluctuations of the RFID readings can be utilized to detect predetermined events that require further investigation, examples of which are provided below.

So configured, the RFID readers 23 continuously or periodically receive signals from RFID tags 66 disposed within the facility 50 and the control circuit 21 stores each reading in the memory 22. Each reading includes the identity of the product display 55 or product 62 to which the RFID tag 26 is coupled or mounted to, a strength of the received signal, and one or more frequencies of the received signal. The control circuit 21 further identifies the time of the reading so that the read rate of the readings over time can be analyzed.

Figure 6:
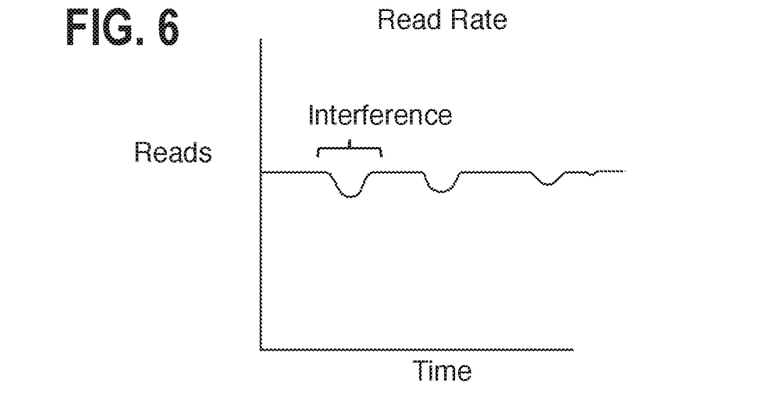
FIG. 6 is a graph in accordance with several embodiments.
Figure 7:
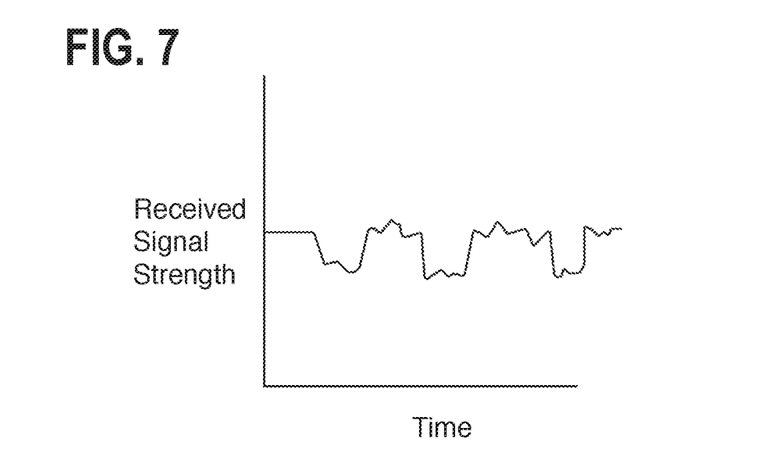
FIG. 7 is a graph in accordance with some embodiments.
Figure 8:
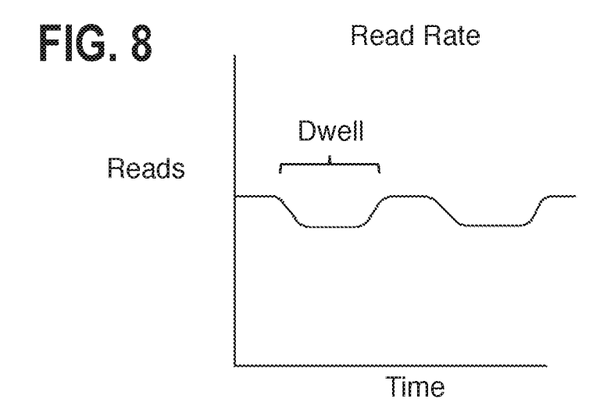
FIG. 8 is a graph in accordance with several embodiments.
Figure 9:
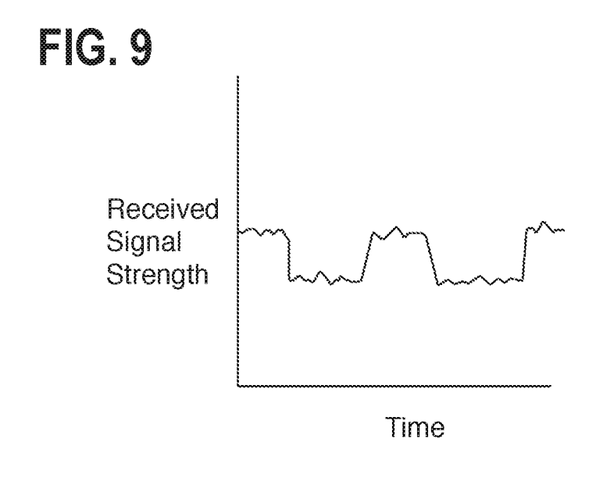
FIG. 9 is a graph in accordance with some embodiments.

FIGS. 6-14 illustrate graphs of read rate and received signal strength for different scenarios or profiles. Individual ones or combinations of these scenarios correspond to events that trigger the dispatch of the AGV 60. In a first example reading scenario, FIGS. 6 and 7 show a plurality of customers walking by a product 62. More specifically, FIG. 6 shows reads over time for a particular RFID tag 66. When the read rate for the particular product 62 drops from a generally consistent line, the drops indicate interference with the signal. In a preferred approach for each of the scenarios described herein, the control circuit 21 analyzes individual frequencies over time to diminish multipath and provide a more reliable indication of interference. FIG. 7 shows received signal strength corresponding to the individual reads for the RFID tag over the same period as FIG. 6. In a second example reading scenario, FIGS. 8 and 9 show a plurality of customers dwelling by a product 62. Similar to the first event, a customer dwelling near the product 62 is reflecting in a drop in the read rate from a generally consistent line. In contrast to the relatively short time period of the first event however, the interference with the signal lasts longer indicating that the customer is generally stationary adjacent to the product 62. For example, a customer walking by a product 62 can be inferred from an interference lasting about 1-3 seconds and a customer dwelling at a product 62 can be inferred from an interference lasting longer than 3 seconds. FIG. 9 shows received signal strength corresponding to the individual reads for the RFID tag 66 over the same period as FIG. 8.

Figure 10:
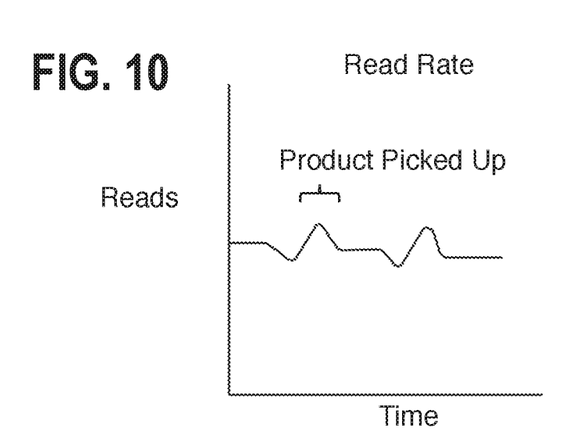
FIG. 10 is a graph in accordance with several embodiments.
Figure 11:
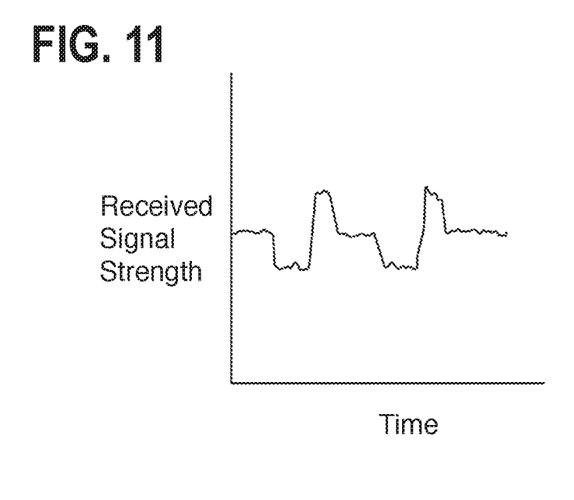
FIG. 11 is a graph in accordance with several embodiments.

In a third example reading scenario, FIGS. 10 and 11 show a product 62 being picked up by a customer. More specifically, FIG. 10 shows reads over time for a particular RFID tag 66. When the read rate spikes, it can be inferred that the product 62 has been moved to a position with a clearer path for communicating with the RFID reader(s) 23. Accordingly, the reads over time shown for a particular RFID tag 66 include the spikes indicating movement by a customer. FIG. 11 shows received signal strength corresponding to the individual reads for the RFID tag 66 over the same period as FIG. 11.

Figure 12:
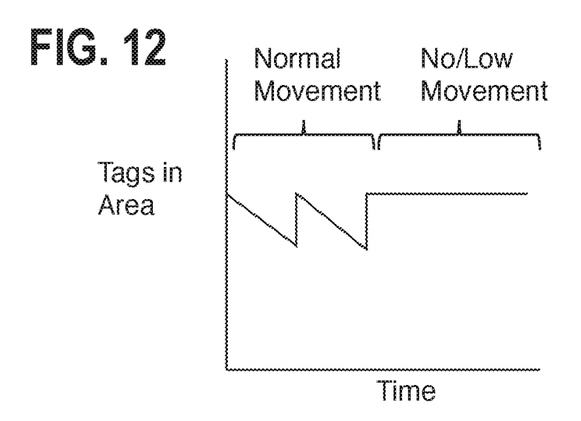
FIG. 12 is a graph in accordance with some embodiments.

In a fourth example reading scenario, FIG. 12 shows a type of product 62 exhibiting less movement than expected. More specifically, FIG. 12 shows a number of RFID tags 66 read in an area for a particular product 62 over time. As customers take the product 62 off the product display for purchase, the RFID reader(s) 23 read fewer tags 66 in the area. An associate then restocks the product 62 and the RFID reader(s) 23 read more tags 66 in the area. Over time, the control circuit 21 can determine a normal movement range with regard to a number of stocked products 62. FIG. 12 shows a scenario where the product 62 is experiencing expected or normal movement over a first period, followed by an unexpected period of no or low movement.

Figure 13:
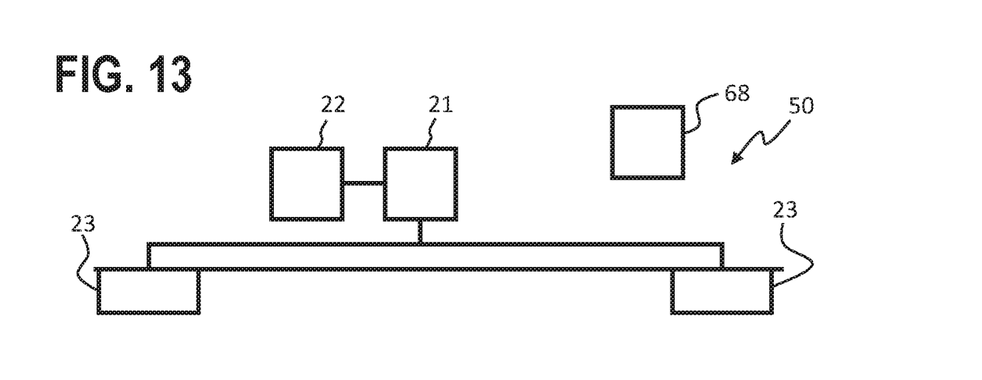
FIG. 13 is a schematic diagram as configured in accordance with several embodiments.

A schematic diagram of the system is shown in FIG. 13. Using these reading scenarios and others, the control circuit 21 can then identify events that correspond to dispatching the AGV 60 for further investigation. In a first example event, if the control circuit 21 determines that the data collected about a particular product 62 reflects scenarios 1, 2, and 3 discussed above, there could be a problem with shelf zoning or a price label for the product. Accordingly, the control circuit 21 instructs the AGV 60 to inspect the location of the product 62 and, specifically, the product display or price label thereof using one or more sensors thereof as set forth below. The control circuit 21 can extrapolate the location of the product 62 based on the readings, as set forth above, and/or can access the memory 22 or a remote database 68 having product stocking and layout information stored thereon to confirm or look up the product location.

In a second example event, if the control circuit 21 determines that the data collected about a particular product 62 reflects scenarios 1 and 2 discussed above, there could be a problem with the product 62 itself that would deter customers from purchasing it, such as damage. Accordingly, the control circuit 21 instructs the AGV 60 to proceed to the location 64 of the product 62 and inspect the product 62 on the product display 55 using one of the sensors thereof described below.

In a third example event, if the control circuit 21 determines that the data collected about a particular product 62 reflects scenarios 1 and 4 discussed above, the product 62 could be plugged on the display 55. Accordingly, the control circuit 21 instructs the AGV 60 to travel to the location 64 of the product 62 and inspect the product display 55 using one or more of the sensors thereof to determine if there is a plug.

In a fourth example event, if the control circuit 21 determines that the data collected about a particular product 62 reflects scenario 4 discussed above and shows that the product 62 has moved locations within the shopping facility 50, the product 62 may have been picked up by a customer or other person and put back in the wrong location 64 within the facility 50 indicated by the RFID tag 66 of the product 62 being read by a different RFID reader 23 than expected. Accordingly, the control circuit 21 instructs the AGV 60 to travel to the new location 64 of the product 62 and verify that the product 62 is in the wrong location or whether the RFID tag 66 thereof fell off.

In a fifth example event, if the control circuit 21 determines that the data collected about a particular product 62 reflects that there are no products 62 of a particular type on the product display 55, but the control circuit 21 also determines that there is pick data associated with the products 62 indicating that the products 62 should be on the display. Accordingly, the control circuit 21 instructs the AGV 60 to travel to the planned location of the product 62 to verify that the product display 55 is stocked with products 62 as indicated by the pick data.

In a sixth example event, if the control circuit 21 determines that the data collected about a particular product 62 or area 64 within the facility 50 indicate that customer traffic adjacent to the product 62 or within the area 64 is lower than expected. In such a situation, the control circuit 21 instructs the AGV 60 to travel to the location of the product 62 or the area 64 to inspect the area 64 for anything that would lead to avoidance by customers, such as a spill, and so forth.

In a seventh example event, if the control circuit 21 determines that the data collected about a type of particular product 62 indicates a number of the particular product 62 are being moved from the expected location within the facility 50 without corresponding sales information for the product 62. In such a situation, the control circuit 21 instructs the AGV 60 to travel to the stocking location of the product 62 to inspect the product display 55 thereof to determine inventory levels. The control circuit 21 can retrieve the sales information for the facility 50 from the memory 22/database 68 or receive the sales information from point-of-sales devices 70 within the facility 50. The control circuit 21 can further check stocking data for the product 62 stored on the memory 22 or database 68.

By a further approach, the product displays 55, such as the end-cap displays 52, the racks 53, and the free-standing presentations 54, for example, can include a corresponding RFID tag 72. So configured, products 62, when stocked thereon, will generally interfere with the signal from the display RFID tag 72. Accordingly, as stock is depleted the reader(s) 23 will eventually be able to read the RFID tag 72. In response to receiving the signal, the control circuit 21 dispatches the AGV 60 to inspect the product display 55 to determine if the product 62 needs to be restocked. Further, after determining that the product 62 needs to be restocked, the control circuit 21 can forward the information to a supplier of the product 62 so that the supplier sends more inventory.

Figure 14:
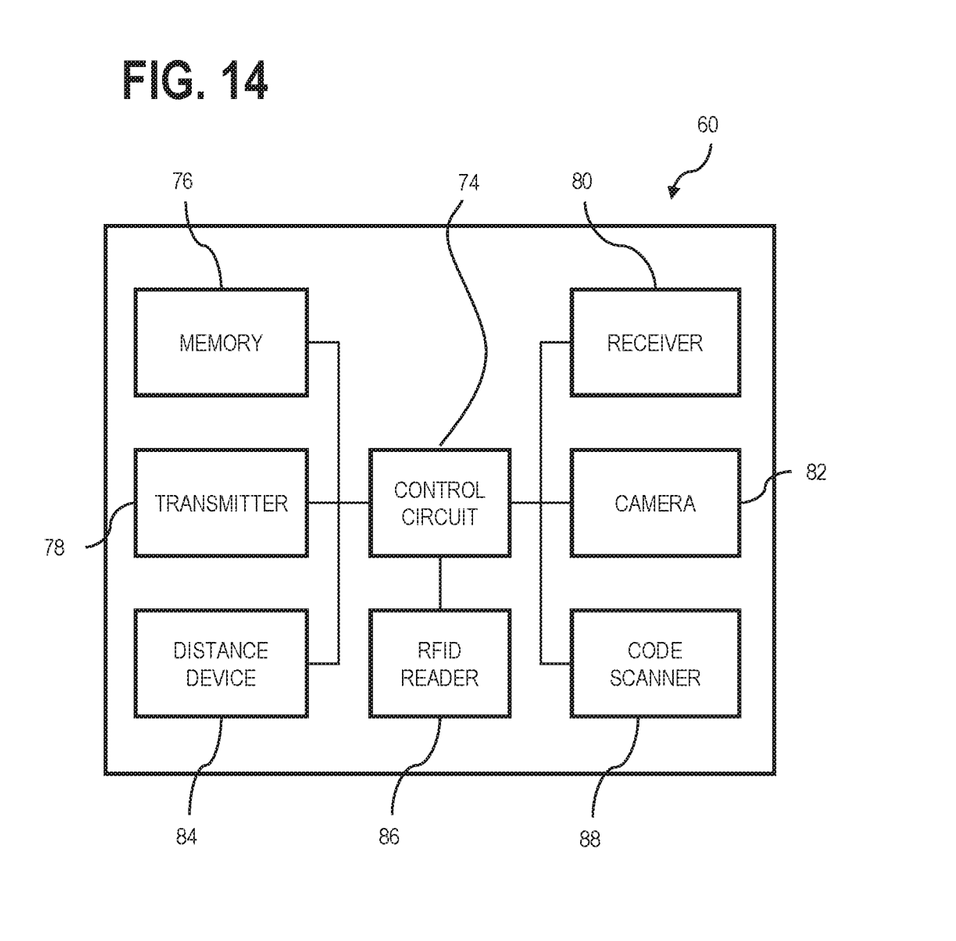
FIG. 14 is a block diagram as configured in accordance with some embodiments.
Figure 15:
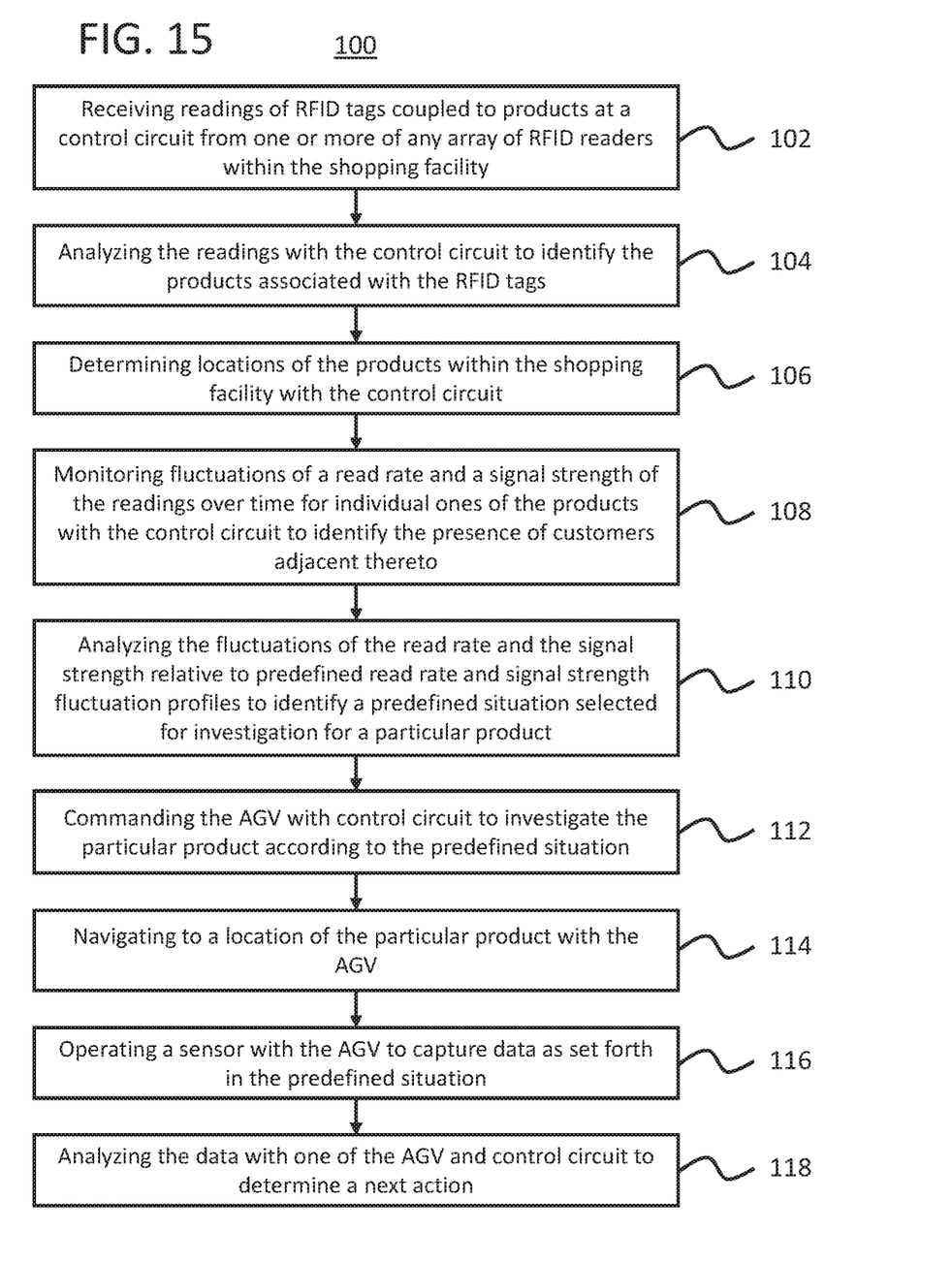
FIG. 15 is a flowchart in accordance with several embodiments.

A diagram of the AGV 60 is shown in FIG. 14. The AGV 60 can include a control circuit 74, a memory 76, a transmitter 78, a receiver 80, and one or more sensors or devices to inspect the location for each particular event, each of which will be described herein. The AGV 60 can first include one or more cameras 82. The camera or cameras 82 are preferably oriented and configured to capture media, such as images or video as desired, in desired locations, and heights, to successfully investigate the event. For example, each camera 82 can be rotatably mounted to the AGV 60 to be controllably driven thereby along one or more axes to orient the camera 82 as desired, such as downward at the floor, horizontally at shelves, or upward, at hanging features. Further, if desired, the camera 82 can be movable along a vertical axis, such as by any suitable device, including a telescoping mount, a track, or the like, so that the camera 82 can be used to capture media of product displays 55 at a variety of heights. Alternatively, or in addition thereto, the AGV 60 can include an array of cameras 82 mounted and oriented to capture media in a frame that will encompass all desired heights and angles.

By another approach, the AGV 60 includes a distance measurement device 84, such as lidar, laser, optical, and so forth. Using the distance measurement device 84, the AGV 60 can measure the distance to the product display 55 and the distance to a first product 62 in each facing to thereby determine a stock level of the product display 55.

By further approaches, the AGV 60 can include a RFID reader 86 that is configured to read the RFID tags 66, 72 at the location 64 to thereby determine which, and how many, products 62 are on the display 55. The AGV 60 can also include a machine-readable code scanner 88, such as a barcode or QR code scanner, that is configured to scan codes on the products 62 to thereby identify and count the number of products 62 on the display 55.

After collecting data using one or more of the sensors based on the particular event at the location 64 thereof, the AGV 60 can transmit the data to the central control circuit 21 for further analysis, or can perform analysis locally with the control circuit 74 thereof. The analysis of the data can result in one or more of the following being identified: a low stock state, an adequate stock state, no issues, an incorrectly zoned product display, a disorganized shelf requiring product arrangement, a plugged shelf, a spill or other hazard needing cleaning, an item or product needing to be moved, an unattached RFID tag, and so forth. For any identifications requiring follow-up by an associate, the control circuit 21 can then create a task for an associate to perform the needed action.

In some embodiments, as system for monitoring a shopping facility using radio frequency identification (RFID) tags is described herein that includes a database storing predefined read rate and signal strength fluctuation profiles, an array of RFID readers within the shopping facility configured to read RFID tags coupled to products within the shopping facility, an automated ground vehicle (AGV) having a sensor, and a control circuit in communication with the database, the array of RFID readers, and the AGV. The control circuit is configured to: receive readings of RFID tags from one or more of the RFID readers; analyze the readings to identify the products associated with the RFID tags; determine locations of the products within the shopping facility; monitor fluctuations of a read rate and signal strength of the readings over time for individual ones of the products to identify the presence of customers adjacent thereto; analyze the fluctuations of the read rate and the signal strength relative to the predefined read rate and signal strength fluctuation profiles to identify a predefined situation selected for investigation for a particular product; and command the AGV to investigate the particular product according to the predefined situation. The AGV is configured to: navigate to a location of the particular product; and operate the sensor to capture data as set forth in the predefined situation. At least one of the control circuit and the AGV is further configured to analyze the data to determine a next action.

By several approaches, the control circuit can be configured to monitor the fluctuations of the read rate and the signal strength to identify products with fewer readings over time to thereby identify a possible interference of the particular product.

By some approaches, the control circuit can be configured to monitor the readings of the RFID tags for the individual ones of the products to track movement thereof. By further approaches, the control circuit can be configured to correlate the movement of the particular product to the presence of customers adjacent thereto.

By several approaches, the system can include product displays within the shopping facility that have RFID tags coupled thereto; and the control circuit can be further configured to: monitor fluctuations of a read rate and a signal strength of the readings over time from the RFID tags for the product displays; and analyze the fluctuations of the read rate and the signal strength of both the RFID tags for the products and the RFID tags for the product displays to identify the predefined situation.

By some approaches, the system further can include a stocking database having stocking information stored therein; and the control circuit can be further configured to: determine the location of the particular product in 3D space within the shopping facility based on the readings; and compare the location of the particular product with a stocking location for the particular product indicated in the stocking information.

By several approaches, the system can further include a point-of-sale database having sales information stored thereon, and wherein the control circuit can be further configured to compare the fluctuations of the read rate and the signal strength to the sales information to correlate movement of the particular product with sales for the particular product.

In some embodiments, a method for monitoring a shopping facility using radio frequency identification (RFID) tags is described herein that includes: receiving readings of RFID tags coupled to products at a control circuit from one or more of any array of RFID readers within the shopping facility; analyzing the readings with the control circuit to identify the products associated with the RFID tags; determining locations of the products within the shopping facility with the control circuit; monitoring fluctuations of a read rate and a signal strength of the readings over time for individual ones of the products with the control circuit to identify the presence of customers adjacent thereto; analyzing the fluctuations of the read rate and the signal strength relative to predefined read rate and signal strength fluctuation profiles obtained from a database storing the predefined read rate and signal strength fluctuation profiles to identify a predefined situation selected for investigation for a particular product; commanding the AGV with control circuit to investigate the particular product according to the predefined situation; navigating to a location of the particular product with the AGV; operating a sensor with the AGV to capture data as set forth in the predefined situation; and analyzing the data with one of the AGV and control circuit to determine a next action.

By some approaches, monitoring the fluctuations of the read rate and the signal strength can further include identifying products with fewer readings over time to thereby identify a possible interference of the particular product.

By several approaches, monitoring the readings of the RFID tags can further include monitoring the readings of the RFID tags for the individual ones of the products to track movement thereof. By further approaches, the method can include correlating the movement of the particular product to the presence of customers adjacent thereto.

By some approaches, product displays within the shopping facility can have RFID tags coupled thereto; and the method can further include: monitoring fluctuations of a read rate and a signal strength of the readings over time of the RFID tags for the product displays; and analyzing the fluctuations of the read rate and the signal strength of both the RFID tags for the products and the RFID tags for the product displays to identify the predefined situation.

By several approaches, the method can further include: determining the location of the particular product in 3D space within the shopping facility with the control circuit based on the readings; and comparing the location of the particular product with a stocking location for the particular product indicated in stocking information for the shopping facility with the control circuit.

By some approaches, the method can further include comparing the fluctuations of the read rate and the signal strength to sales information for the shopping facility to correlate movement of the particular product with sales for the particular product.

By several approaches, the method can further include creating a task for an associate based on the analysis of the data.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for monitoring a shopping facility using transmitters, the system comprising:
   an array of receivers within the shopping facility configured to read transmitters coupled to products within the shopping facility;
   an automated ground vehicle (AGV) having a sensor;
   a control circuit in communication with the database, the array of receivers and the AGV, the control circuit configured to:
      receive readings of transmitters from one or more of the receivers;
      analyze the readings to identify the products associated with the transmitters;
      determine locations of the products within the shopping facility;
      monitor fluctuations of a read rate and signal strength of the readings over time for individual ones of the products to identify the presence of customers adjacent thereto to identify a predefined situation selected for investigation for a particular product;
      command the AGV to investigate the particular product according to the predefined situation;
   wherein the AGV is configured to:
      navigate to a location of the particular product; and
      operate the sensor to capture data as set forth in the predefined situation;
   wherein at least one of the control circuit and the AGV is further configured to analyze the data to determine a next action.

2. The system of claim 1, wherein the control circuit is configured to monitor the fluctuations of the read rate and the signal strength to identify products with fewer readings over time to thereby identify a possible interference of the particular product.

3. The system of claim 1, wherein the control circuit configured to monitor the readings of the transmitters for the individual ones of the products to track movement thereof.

4. The system of claim 3, wherein the control circuit is further configured to correlate the movement of the particular product to the presence of customers adjacent thereto.

5. The system of claim 1, wherein product displays within the shopping facility have transmitters thereto; and the control circuit is configured to:
monitor fluctuations of a read rate and a signal strength of the readings over time from the transmitters for the product displays;
analyze the fluctuations of the read rate and the signal strength of both the transmitters for the products and the transmitters for the product displays to identify the predefined situation.

6. The system of claim 1, further comprising a stocking database having stocking information stored therein, and wherein the control circuit is further configured to:
determine the location of the particular product in 3D space within the shopping facility based on the readings; and
compare the location of the particular product with a stocking location for the particular product indicated in the stocking information.

7. The system of claim 1, further comprising a point-of-sale database having sales information stored thereon, and wherein the control circuit is further configured to compare the fluctuations of the read rate and the signal strength to the sales information to correlate movement of the particular product with sales for the particular product.

8. The system of claim 1, wherein the sensor comprises a measurement sensor, and the data comprises a depth measurement of a product display at the location of the particular product to determine stock levels.

9. The system of claim 1, wherein the sensor comprises a camera; and the data comprises an image of the location.

10. The system of claim 1, wherein the control circuit is further configured to create a task for an associate based on the analysis of the data.

11. A method for monitoring a shopping facility transmitters, the method comprising:
receiving readings of transmitters coupled to products at a control circuit from one or more of any array of receivers within the shopping facility;
analyzing the readings with the control circuit to identify the products associated with the transmitters;
determining locations of the products within the shopping facility with the control circuit;
monitoring fluctuations of a read rate and a signal strength of the readings over time for individual ones of the products with the control circuit to identify the presence of customers adjacent thereto;
commanding the AGV with control circuit to investigate the particular product according to the predefined situation;
navigating to a location of the particular product with the AGV;
operating a sensor with the AGV to capture data as set forth in the predefined situation;
analyzing the data with one of the AGV and control circuit to determine a next action.

12. The method of claim 11, wherein monitoring the fluctuations of the read rate and the signal strength further comprises identifying products with fewer readings over time to thereby identify a possible interference of the particular product.

13. The method of claim 11, monitoring the readings of the transmitters further comprises monitoring the readings of the transmitters for the individual ones of the products to track movement thereof.

14. The method of claim 13, further comprising correlating the movement of the particular product to the presence of customers adjacent thereto.

15. The method of claim 11, wherein product displays within the shopping facility have transmitters coupled thereto; the method further comprising:
monitoring fluctuations of a read rate and a signal strength of the readings over time of the transmitters for the product displays;
analyzing the fluctuations of the read rate and the signal strength of both the transmitters for the products and the transmitters for the product displays to identify the predefined situation.

16. The method of claim 11, further comprising:
determining the location of the particular product in 3D space within the shopping facility with the control circuit based on the readings; and
comparing the location of the particular product with a stocking location for the particular product indicated in stocking information for the shopping facility with the control circuit.

17. The method of claim 11, further comprising comparing the fluctuations of the read rate and the signal strength to sales information for the shopping facility to correlate movement of the particular product with sales for the particular product.

18. The method of claim 11, wherein operating the sensor with the AGV to capture the data as set forth in the predefined situation comprises operating a measurement sensor to determine a depth measurement of a product display at the location of the particular product to determine stock levels.

19. The method of claim 11, wherein operating the sensor with the AGV to capture the data as set forth in the predefined situation comprises operating a camera to capture an image of the location.

20. The method of claim 11, further comprising creating a task for an associate based on the analysis of the data.

* * * * *